Figure 1:
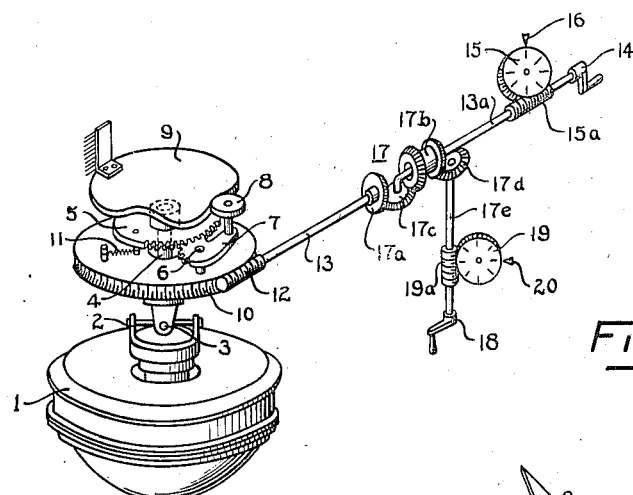

Oct. 31, 1939.   F. LAUCK   2,178,306

COURSE DEVICE FOR VEHICLES

Filed June 25, 1937

INVENTOR.
Friedrich Lauck
BY Stephen Cerstvik
ATTORNEY.

Patented Oct. 31, 1939

2,178,306

UNITED STATES PATENT OFFICE 2,178,306

COURSE DEVICE FOR VEHICLES

Friedrich Lauck, Berlin-Spandau, Germany, assignor to Siemens Apparate und Maschinen Gesellschaft mit beschränkter Haftung, Berlin, Germany, a corporation of Germany Application June 25, 1937, Serial No. 150,415 In Germany June 29, 1936

2 Claims. (Cl. 33—224)

This invention relates to course maintaining devices for vehicles, such as aircraft, and more particularly to devices of the above type which include means responsive to the earth's magnetic field and are adapted to indicate direction or to control the course of the vehicle.

An object of the invention is to provide a device of the above type which is automatically corrected to compensate for the compass deviation caused by the metallic parts of the vehicle itself.

Another object is to provide a device of the above type having means to correct the compass variation due to the known angular variation in the earth's magnetic field.

Other objects and advantages will be apparent as the nature of the invention is more fully disclosed.

Although the novel features which are believed to be characteristic of this invention will be particularly pointed out in the claims appended hereto, the invention itself may be better understood by referring to the following description, taken in connection with the accompanying drawing, in which certain specific embodiments of the invention have been set forth for purposes of illustration.

Figure 2:
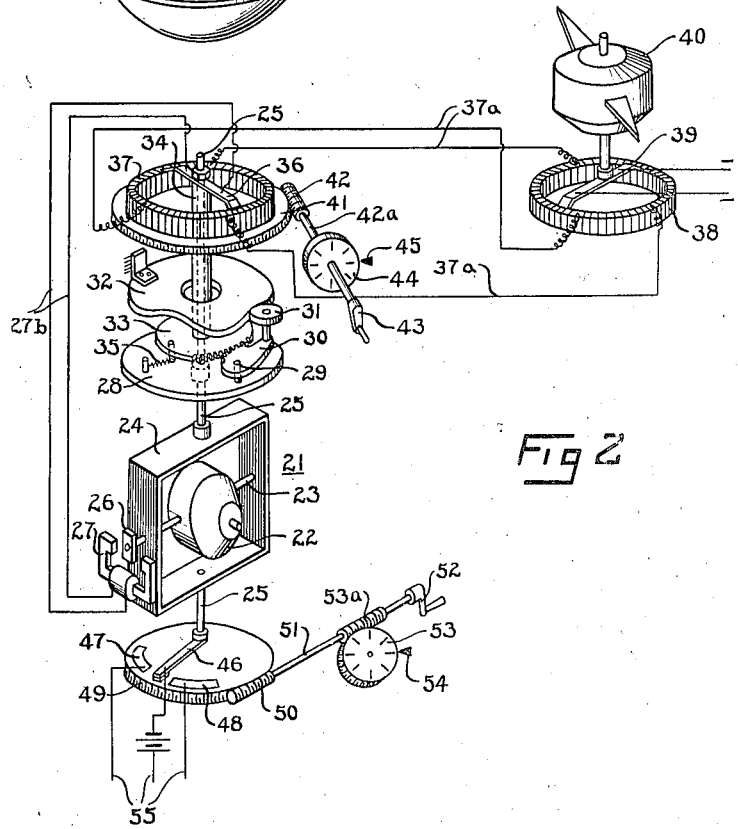

In the drawing,

Fig. 1 is a perspective view, partially diagrammatic, illustrating a directional compass embodying the present invention; and, Fig. 2 is a similar view illustrating the invention as applied to a compass-controlled, directional gyro.

In the following description and in the claims certain specific terms are used for convenience in referring to various details of the invention. It is to be understood, however, that these terms are to be given as broad an interpretation as the state of the art will permit.

Referring to the embodiment shown in Fig. 1, a compass 1 is disclosed which may be of any standard type having a directional element responsive to the earth's magnetic field mounted in cooperative relation with a course member such as a compass card and which compass is suspended by links 2 and 3 from a shaft 4 in such manner that the compass at all times remains horizontal. A disc 5 is carried by the shaft 4 and is provided at its periphery with teeth which are engaged by a pinion 6, attached to a lever 7. The lever 7 carries a roller 8, engaging a cam disc 9, which is fixed with respect to the vehicle. The pinion 6 is carried on a worm wheel 10 which is coaxial with the shaft 4 and is coupled with the disc 5 by means of a spring 11 which is adapted to take up any slack or looseness between the disc 5 and the pinion 6 and to hold the roller 8 against the surface of the cam disc 9.

The worm wheel 10 is adjusted by means of a worm 12, carried by a shaft 13 and controlled by a crank 14 actuating a shaft 13a, which is connected to the shaft 13 by means of a differential gear 17. The differential gear 17 comprises a disc 17a attached to the shaft 13 and a sleeve 17b journalled on the shaft 13a, said disc 17a and sleeve 17b engaging a pinion 17c carried by the shaft 13a. The sleeve 17b is actuated by a gear 17d carried by a shaft 17e which is controlled by a crank 18. A suitable scale 15, cooperating with an index mark 16, is actuated by a worm 15a carried by the shaft 13a to indicate the adjustment effected by the crank 14. A similar scale 19, cooperating with an index mark 20, is actuated by a worm 19a mounted on a shaft 17e to indicate the adjustment effected by the crank 18.

In the operation of the above described device the desired course is set by adjusting the course member by means of the crank 14 and the scale 15. This adjustment is effected by the unitary movement of the shafts 13 and 13a which, through the worm 12 and the worm wheel 10 and pinion 6, cause a corresponding movement of the disc 5, thereby displacing the housing of the compass 1 and setting the compass to the course desired. During this adjustment the roller 8 rolls around the surface of the cam disc 9, thereby causing the pinion 6 to rotate slightly and to vary the angular position of the disc 5 by an amount dependent upon the contour of the cam disc 9. The cam disc 9 is designed to compensate for the deviation caused by the vehicle itself, such as by the distribution of the magnetic masses which affect the accuracy of the compass. This cam disc 9 and associated mechanism accordingly automatically compensates for the compass deviation and eliminates this element from consideration by the navigator.

The variation of the compass, produced by the directional variation in the earth's magnetic field and which may be determined from charts or tables, is compensated for by means of the crank 18 and scale 19 which acts through the differential gear 17 to make an adjustment of the worm wheel 10 similar to that above described.

With this device the course may be set to the desired angular position by means of the scale 15. Thereafter it is only necessary to make the necessary adjustment according to the scale 19 to compensate for the variation of the compass at the particular localities involved. Hence all mental calculations are eliminated and the accurate adjustment of the compass to the desired course is facilitated.

In Fig. 2 the invention is shown as applied to a compass-supervised, directional gyro comprising a directional gyro 21, the gyroscope of which is actuated in any standard manner and is supported in a housing 22. This housing is mounted in a gimbal ring 24 by means of a precession shaft 23 which is perpendicular to the axis of rotation of the gyroscope. The gimbal ring 24 is mounted on a shaft 25 which is perpendicular to the shaft 23 and is carried in suitable bearings (not shown). A permanent magnet 26 is mounted on the shaft 23 in the field of an electromagnet 27.

A disc 28 is mounted on the shaft 25 and carries a pinion 29 having teeth engaging the periphery of a toothed disc 33. The pinion 29 is attached to a lever 30 carrying a roller 31 which engages the surface of a stationary cam disc 32. The toothed disc 33 is mounted on a sleeve 34 which is rotatable with respect to the shaft 25. A spring 35 interconnects the disc 28 and the toothed disc 33 so as to eliminate lost motion and to hold the roller 31 against the surface of the cam disc 32.

A double contact arm 36 is mounted on the sleeve 34 and engages a resistance unit 37 which is suitably connected by leads 37a to a similar resistance unit 38 with which a second double contact arm 39 is in contact. The double contact arm 39 is actuated by a standard compass 40 so as to assume a position according to the position of the compass needle.

The resistance unit 37 is mounted on a worm wheel 41 which is engaged by a worm 42 mounted on a shaft 42a and actuated by a crank 43. A scale 44 may be mounted on the shaft 42a and may cooperate with an index mark 45 to indicate the adjustment effected by the crank 43.

The lower end of the shaft 25 carries a contact arm 46 which is adapted to make contact with contact members 47 and 48 carried by a disc 49. The disc 49 carries a worm gear which is actuated by a worm 50 carried by a shaft 51 and controlled by a crank 52. A scale 53, cooperating with an index mark 54, may be driven by a worm 53a mounted on the shaft 51 to indicate the adjustment effected by the crank 52. The electromagnet 27 is connected by leads 27b with the contact arm 36 so that a voltage is developed in the electromagnet, depending upon the bridge effect of the arm 36. Conducting segments 47 and 48 may be connected by leads 55 to a suitable direction indicating device or to a direction control device such as a servo-motor or the like (not shown) which is adapted to control the course of the vehicle.

In the operation of this embodiment, a voltage is developed in the arm 36 dependent upon the bridge effect thereof which, in turn, depends upon the relative angular displacement between the arms 36 and 39 and becomes zero when the arms 36 and 39 are in the same relative angular positions. This voltage is impressed upon electromagnet 27 and thereby produces a field which, acting upon the permanent magnet 26, produces a torque on the precession shaft 23 in a direction such that the precession effect of the gyro causes the shaft 25 to rotate. This rotation of the shaft 25 continues until the angular position of the arm 36 corresponds to that of the arm 39.

It will be noted, however, that the shaft 25 and the sleeve 34 are interconnected by the cam disc 32 and roller 31, similar to the cam disc 9 and roller 8 of Fig. 1, which are designed to compensate for the compass deviation produced by the craft itself. The shaft 25 is accordingly caused to assume a position which corresponds to the angular position of the compass 40 corrected for such deviation. The directional variation may be compensated for by suitable adjustment of the crank 43 which causes rotation of the worm wheel 41 and the resistance unit 37.

In this embodiment the course may be set by means of crank 52 which causes suitable displacement of the course member comprising disc 49 which is thereby displaced with respect to the arm 46 held in position by the gyro controlled by the compass 40. Any change in the direction of the vehicle from this course, through the mechanism above described, causes the arm 46 to make contact with the contact members 47 or 48 and thereby to complete a circuit to a suitable mechanism, not shown, for indicating or for correcting such change.

It will be noted that the systems above described provide an accurate means for automatically correcting the deviation of the compass needle without introduction of magnetic masses or other correcting means which tend to distort the direction of the earth's field. Means is also provided so that the variation of the compass can be easily corrected by the navigator. In operation it is only necessary to make two adjustments, namely, the course adjustment effected in accordance with scale 15 of Fig. 1 or the scale 53 of Fig. 2, and the variation adjustment which is effected in accordance with the scale 19 of Fig. 1 or the scale 44 of Fig. 2.

Although certain specific embodiments of the invention have been shown for purposes of illustration, it is to be understood that various changes and modifications may be made therein as will appear to a person skilled in the art. The invention is only to be limited in accordance with the following claims when interpreted in view of the prior art.

What is claimed is:

1. A course maintaining device for vehicles comprising a magnetic directional element responsive to the earth's field, a shaft, a directional gyro connected to said shaft, electrical means connecting said magnetic means and gyro whereby said gyro is caused to precess to remain in a position approximately relatively fixed with respect to the position of said directional element, means to modify said relatively fixed position in accordance with the deviation of said directional element, comprising a disc connected to said shaft, a second disc connected to said electrical means, means resiliently connecting said first and second discs, a fixed cam having a contour corresponding to the deviation of said directional element and means attached to one of said discs and connected to the other disc and engaging said cam to relatively rotate said discs as the shaft turns, whereby the position of the other of said discs is varied upon movement of the gyro to vary the effect of said electrical means whereby said relatively fixed position is modified in accordance with the deviation of said directional element.

2. A course maintaining device for a vehicle comprising a magnetic compass, a gyro, a course member in cooperative relation with said gyro, means responsive to variations in the positions of said compass and gyro producing precession of said gyro from an approximately definite azimuthal relation, a first disc, means controlled by said disc for inducing said precession, a pinion engaging said disc, a second disc carying said pinion and attached to said gyro for movement in azimuth therewith, and cam means fixed to said vehicle and controlling said pinion so as to vary the relative position of said first disc in accordance with the known deviation of said compass.

FRIEDRICH LAUCK.